United States Patent [19]

Ogura et al.

[11] 3,801,339

[45] Apr. 2, 1974

[54] EXPANSIVE ADDITIVE FOR LIME CEMENT AND PROCESS FOR THE PREPARATION OF THE SAME

[75] Inventors: Hirokatsu Ogura; Tatsuo Takizawa, both of Tokyo; Yoshizo Ono; Yukuo Taketsume, both of Niigata, all of Japan

[73] Assignee: Denki Kagaku Kogyo Kabushiki Kaisha, Tokyo, Japan

[22] Filed: Aug. 6, 1971

[21] Appl. No.: 169,811

Related U.S. Application Data

[62] Division of Ser. No. 43,050, June 3, 1970, abandoned.

[30] Foreign Application Priority Data

June 3, 1969  Japan..........................44-42920

[52] U.S. Cl..................................... 106/97, 106/314
[51] Int. Cl............................................. C04b 13/22

[58] Field of Search........ 106/89, 97, 102, 314, 315

[56] References Cited
UNITED STATES PATENTS

| | | | |
|---|---|---|---|
| 1,997,782 | 4/1935 | Windecker | 106/102 |
| 3,232,778 | 2/1966 | Dean | 106/97 |
| 3,251,701 | 5/1966 | Klein | 106/89 |

*Primary Examiner*—James E. Poer
*Attorney, Agent, or Firm*—Sughrue, Rothwell, Mion, Zinn & Macpeak

[57] ABSTRACT

An expansive additive composition for use in controlling the expansion of cement on aging comprising a sintered mixture of lime and at least one additive selected from the group consisting of ferric oxide, calcium fluoride and calcium sulfate is disclosed. The process for preparing the expansive additive composition is also disclosed.

4 Claims, 3 Drawing Figures

CaO + Fe₂O₃
(ADDITION RATIO = 6% EXPANSIVE CEMENT)

CaO + CaF₂
(ADDITION RATIO = 4% EXPANSIVE CEMENT)

CaO + CaSO₄
(ADDITION RATIO = 5% EXPANSIVE CEMENT)

HIROKATSU OGURA
TATSUO TAKIZAWA
YOSHIZO ONO
YUKUO TAKETSUME

BY Sughrue, Rothwell, Mion Zinn & Macpeak

ATTORNEYS 3,801,339

EXPANSIVE ADDITIVE FOR LIME CEMENT AND PROCESS FOR THE PREPARATION OF THE SAME

CROSS REFERENCE TO RELATED APPLICATIONS

This application is a division of application Ser. No. 43,050, filed June 3, 1970, now abandoned.

BACKGROUND OF THE INVENTION

1. Field of the Invention

The present invention relates to an expansive additive for lime system cements and to a process for preparing an expansive additive for lime system cements. More particularly, this invention relates to a process for preparing an expansive additive for lime system cements by adding to lime at least one of the ferric oxides, calcium fluoride, and calcium sulfate and sintering or melting the mixture.

2. Description of the Prior Art

A cement containing free lime or calcium oxide frequently expands during the setting and hardening thereof. Hence, such a cement has hitherto been considered to be undesirable since the expansion causes a lack of stability in quality.

On the other hand, however, were it possible to control the expansion characteristics of such a cement so that the expansion of the cement occurred at a proper period after hardening of the cement, it might be quite preferable. In the case of compounding ordinary calcium oxide prepared by sintering limestone at a temperature of about 1,200°C to 1,400°C in a cement, it expands rapidly immediately after setting. Hence, such a cement cannot be used practically.

Investigations of a sintering process for lime, capable of maintaining a mild expansion characteristic of the cement up to a suitable time after hardening of the cement by improving the rapid expansion of the free lime, resulted in the discovery of the process of this invention.

SUMMARY OF THE INVENTION

The present invention is a process for the preparation of an expansive additive for lime system cement which comprises adding at least one member selected from the group consisting of ferric oxide ($Fe_2O_3$), calcium fluoride ($CaF_2$), and calcium sulfate ($CaSO_4$) to lime, crushing the mixture, and sintering or melting the mixture at a temperature at which the additive or additives are not decomposed.

The clinker thus obtained effectively controls the occurrence of the rapid expansion accompanied by the use of lime alone to cause a mild and prolonged expansion of a cement containing the clinker at the proper time during the progress of hardening of the cement. Hence, it is used as a very effective inflating agent for cement.

DETAILED DESCRIPTION OF THE INVENTION

As the lime used in this invention as the main raw material, any material which can provide a CaO source, such as limestone, calcium oxide or calcium hydroxide, may be employed.

The ferric oxide used as one of the additives to the lime in this invention is mainly composed of $Fe_2O_3$ and can contain impurities but it is necessary that such impurities be inactive toward lime. In particular, mill scale is preferably utilized as the ferric oxide. Also, the calcium fluoride and the calcium sulfate to be used as the additives in this invention can contain impurities which are inactive toward lime. Generally, commercially available materials can be employed as such additives.

The amounts of ferric oxide, calcium fluoride, and calcium sulfate to the lime will be explained by relating the amounts added in terms of CaO and to the expansion effect of a mortar prepared by compounding the expansive additive formed by sintering the mixture of lime and the additives in a cement as shown in the accompanying drawings.

The cement expansive additive prepared by mixing a powdered limestone crushed to a size smaller than 88 microns and a ferric oxide powder ($Fe_2O_3$) crushed into a size smaller than 88 microns in the weight ratio shown in the table below, heating the mixed powders in an electric muffle furnace for 2 hours at temperatures of 1,400°–1,450°C to provide a clinker, and crushing the clinker to a size smaller than 149 microns was compounded in a cement in an amount of 6 percent by weight. The relation between the expansion characteristics of the cement and the curing period (in days) is shown in FIG. 1.

| Test No. | CaO | $Fe_2O_3$ |
|---|---|---|
| A | 95 | 5 |
| B | 90 | 10 |
| C | 85 | 15 |
| D | 75 | 25 |
| E | 63 | 35 |
| F(control) | 100 | 0 |

Figure 1:
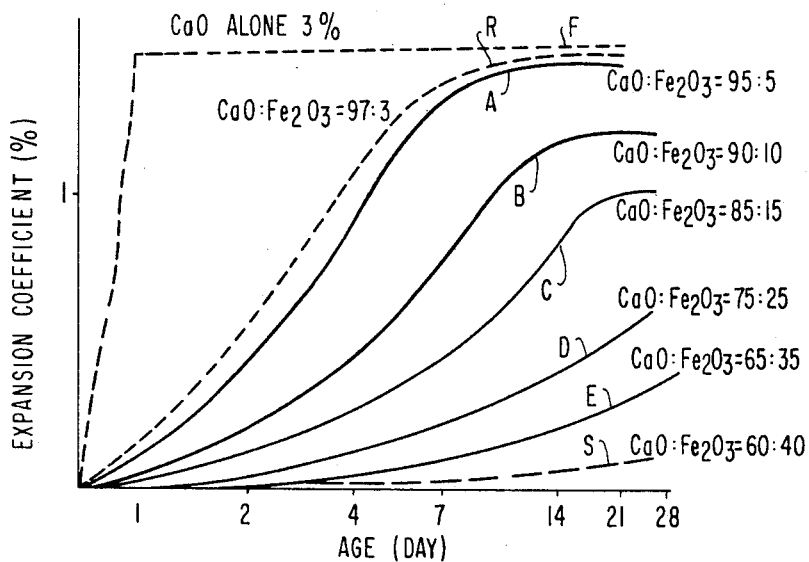
FIG. 1 is a graph showing the characteristics concerning the expansion coefficient of a cement, having added thereto a cement expansive additive containing lime and ferric oxide, with age.

For comparison, calcium oxide (CaO), prepared by baking the powder of limestone for 1 hour at 1,400°C without added $Fe_2O_3$, was added to a cement in an amount of 3 percent by weight and the relation of the expansion characteristics of the cement and the curing period is shown in FIG. 1 as Curve F.

Figure 2:
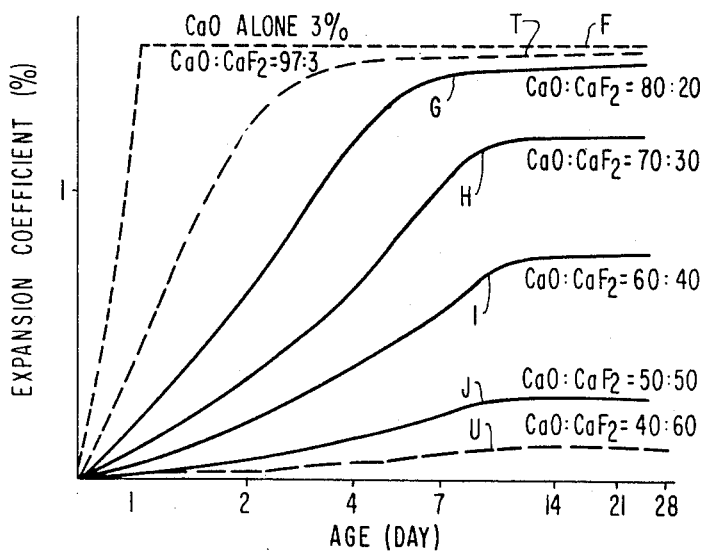
FIG. 2 is a graph showing the characteristics concerning the expansion coefficient of a cement having added thereto a cement expansive additive containing lime and calcium fluoride, with age.

Also, the expansive additive prepared similarly by mixing powdered limestone crushed smaller than 88 microns and powdered calcium fluoride ($CaF_2$) crushed smaller than 88 microns in the weight ratio shown in the following table, sintering the mixture by heating the mixture in an electric muffle furnace under the same conditions as used for FIG. 1 to provide a clinker, and crushing the clinker smaller than 149 microns was compounded in a cement in an amount of 4 percent by weight. The relation of the expansion characteristics of the cement and the curing period in days is shown in FIG. 2. For comparison, the use of powdered calcium oxide alone is also shown in FIG. 2 as Curve F.

| Test No. | CaO | CaF$_2$ |
| --- | --- | --- |
| G | 80 | 20 |
| H | 70 | 30 |
| I | 60 | 40 |
| J | 50 | 50 |
| F (control) | 100 | 0 |

Figure 3:
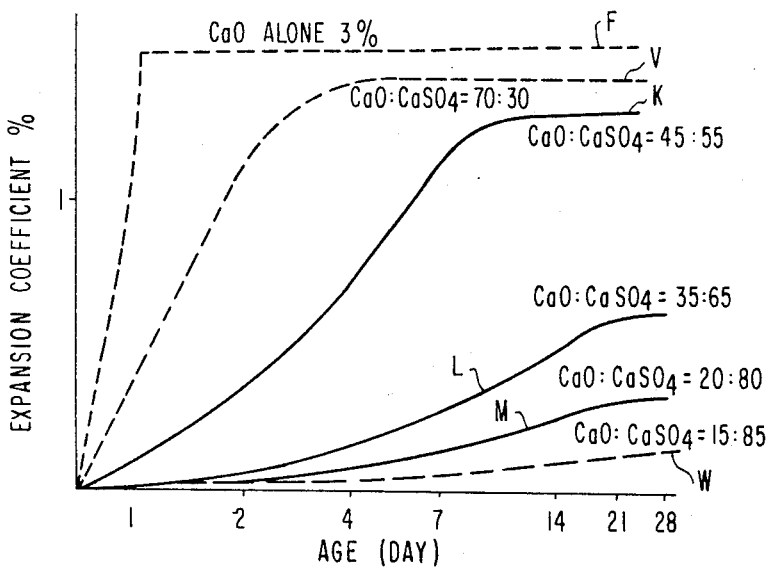
FIG. 3 is a graph showing the characteristics concerning the expansion coefficient of a cement, having added thereto a cement expansive additive containing lime and calcium sulfate, with age.

Moreover, the expansive additive prepared by mixing powdered limestone crushed smaller than 88 microns and powdered calcium sulfate (CaSO$_4$) crushed smaller than 88 microns in the mixing ratio shown in the table below, sintering the mixture by heating it in an electric muffle furnace for 2 hours at 1,200°–1,300°C to provide a clinker, and crushing the clinker smaller than 149 microns was compounded in a cement in an amount of 5 percent by weight. The relation between the expansion characteristics and the curing period is shown in FIG. 3. For comparison, use of powdered calcium oxide alone is shown in the same FIG. 3 as Curve F.

| Test No. | CaO | CaSO$_4$ |
| --- | --- | --- |
| K | 45 | 55 |
| L | 35 | 65 |
| M | 20 | 80 |
| F (control) | 100 | 0 |

The mortar samples used above were prepared by the JIS R–5201 method and the expansion characteristics of the mortar were obtained by means of comparative measurements of the change of the surface length during curing in water at 20°C using the surface length of sample just after coagulation and release of the mold as the basis.

As is clear from the results shown in FIGS. 1 to 3, the mortar containing calcium oxide alone with no expansion controlling agent such as ferric oxide, calcium fluoride or calcium sulfate, suffered rapid expansion at the beginning of aging, while the mortar containing calcium oxide together with ferric oxide, calcium fluoride or calcium sulfate expanded gradually during aging, as shown by the slowly changing curve, and became stable after about 3 weeks.

The results obtained also show that the expansion characteristics of the mortar are influenced by the amount of expansion controlling agent added and an increase in the amount of the additive, results in a tendency for the expansion of the mortar to occur later.

As far as the results shown in the graphs are concerned, the effect of the addition of ferric oxide, calcium fluoride or calcium sulfate, which contributes to the control of the expansion of the cement, is at a maximum in Curve E, J, or M respectively.

In this respect, further investigations were made into the effective amount of the aforesaid expansion controlling agent together with the minimum amount thereof capable of showing the expansion controlling effect. It was discovered that the critical characteristics were shown by Curves R and S in FIG. 1, Curves T and U in FIG. 2, and Curves V and W in FIG. 3.

Accordingly, the effective amount of ferric oxide to be added is about 3–40% by weight of the total weight of the sintered product, that of calcium fluoride is about 3–60% by weight, and that of calcium sulfate is about 30–85% by weight. In particular, a preferred amount of ferric oxide is from 5 to 35% by weight, that of calcium fluoride is from 20 to 50% by weight, and that of calcium sulfate is from 55 to 80% by weight.

The mixture of limestone and the additive must be heated at temperatures higher than 1,200°C until the mixture becomes a homogeneous sintered state or semi-molten state. If the mixture is insufficiently sintered, the effect obtained with the sintered product is the same as that obtained with calcium oxide alone in the expansion characteristics of the cement to which the clinker is added. In other words, no effect of the additive is obtained. Therefore, when the heating period for sintering the mixture is about 1 to 2 hours, the proper heating temperature is about 1,450°C where ferric oxide is used as the additive, about 1,400°C where calcium fluoride or a mixture of ferric oxide and calcium fluoride is used as the additive, and about 1,200°–1,300°C where calcium sulfate is used as the additive.

In addition, the same experiments described above were repeated using industrial raw materials such as calcium oxide prepared by baking limestone, mill scale, fluoride, and gypsum by-products in the production of hydrofluoric acid instead of the limestone, ferric oxide, calcium fluoride, and calcium sulfate respectively. Almost the same results as described above were obtained.

The amount of the expansive additive in this invention to be compounded with the cement will be explained below.

An expansive additive generally shows different expansion characteristics with the passage of time depending on the composition thereof. Also, when the composition of an expansive additive remains constant, the expansion characteristics thereof were, of course, higher as the amount of the agent to be compounded in cement is increased. Furthermore, since the proper compounding ratio of the expansive additive in this invention to cement necessary for causing an expansion of from 1 to 1.5%, by which the shrinkage of an ordinary cement can be completely prevented, depends upon the composition of the expansive additive. It is generally impossible to define numerically the compounding ratio thereof but it is usually preferable to add the expansive additive to a cement in an amount of from about 3 to 10% by weight based on the weight of the cement. If the amount of the expansive additive is less than about 3% by weight, it cannot provide effective expansion characterics. While, if the amount is larger than 6% by weight, the mechanical strength of the cement after setting is reduced. For example, the most preferred compounding ratio of the expansive additive is about 6% by weight when the ratio of the calcium oxide to the ferric oxide of the inflating agent is 85:15, about 4% by weight when the ratio of the calcium oxide to the calcium fluoride is 70:30, about 5% by weight when the ratios of the calcium oxide to the ferric oxide to the calcium fluoride are 70:15:15, and about 6% by weight when the ratio of the calcium oxide to the calcium sulfate is 45:55.

The invention has been described in terms of blending of mortar but is also applicable to the blending of concrete.

From the above descriptions it will be understood that in the present invention, ferric oxide, calcium fluoride, and calcium sulfate exhibit an effective and a similar function for controlling the expansion characteristics of calcium oxide to cement when they are employed individually or in combination together with calcium oxide.

This invention will be explained further by reference to the following examples.

EXAMPLE 1

A mixture of 91 parts by weight of limestone having a purity of 98% and 9 parts by weight of mill scale was crushed and baked for 2 hours at 1,450°C to provide a clinker for use as an expansive additive. The clinker was crushed and added to a cement in an amount of 5% by weight or 6% by weight to provide cement $\alpha$ and cement $\beta$, respectively. For comparison, a conventional cement containing no such expansive additive was prepared.

By using the cement prepared above a 10 × 10 × 50 cm$^3$ concrete sample was prepared. The composition of the concrete per cubic meter thereof was as follows:

Blend

|  | Blend $\alpha$ | Blend $\beta$ |
|---|---|---|
| Expansive Additive of this Invention | 168 kg | 191 kg |
| Ordinary Portland Cement | 299 kg | 296 kg |
| Water | 218 kg | 218 kg |
| Gravel (2.5 mm in diameter) | 955 kg | 955 kg |
| Sand | 876 kg | 876 kg |
| Total | 2364 kg | 2364 kg |

The expansion coefficient of the concrete during curing in water at 20°C, measured by the above-described method employed with the mortar samples, is shown in the following Table 1.

TABLE 1

| Type | Expansion Coefficient (× 10$^{-3}$%) Age (day) | | | | | | |
|---|---|---|---|---|---|---|---|
|  | 1 | 2 | 4 | 7 | 14 | 21 | 28 |
| Cement $\alpha$ | 12 | 19 | 31 | 48 | 64 | 78 | 79 |
| Cement $\beta$ | 18 | 23 | 39 | 63 | 81 | 101 | 101 |
| Conventional | −2 | 3 | −1 | 2 | 1 | 3 | 2 |

EXAMPLE 2

A powdered mixture of 70 parts by weight of calcium oxide prepared by baking limestones at 1,200°C and 30 parts by weight of fluoride was heated for 2 hours at 1,400°C to provide a clinker as an expansive additive. The clinker was crushed smaller than 149 microns and compounded in a cement in an amount of 4% by weight to provide cement $\gamma$.

Separately, a powdered mixture of 70 parts by weight of calcium oxide, 15 parts by weight of mill scale, and 15 parts by weight of fluoride was heated for 2 hours at 1,400°C to provide a clinker as an expansive additive. The clinker was crushed into a size smaller than 149 microns in diameter and compounded in a cement in an amount of 5% by weight to provide cement $\delta$.

The expansion coefficients of the cements prepared above were measured by the same test procedure as used in Example 1 and the results are shown in Table 2.

TABLE 2

| Type | Expansion Coefficient (x 10$^{-3}$%) Age (day) | | | | | | |
|---|---|---|---|---|---|---|---|
|  | 1 | 2 | 4 | 9 | 14 | 21 | 28 |
| Cement $\delta$ | 122 | 180 | 195 | 202 | 212 | 223 | 223 |
| Cement $\delta$ | 54 | 81 | 120 | 168 | 187 | 196 | 198 |

EXAMPLE 3

A powdered mixture of calcium oxide having a purity of 98 percent and a gypsum by-product obtained in the production of hydrofluoric acid and having a purity of 90 percent mixed in a weight ratio of 40:60 or 20:80 and was baked for 2 hours at 1,200°C to provide a clinker as an expansive additive. The clinker was crushed to smaller than 149 microns and was added to a cement in an amount of 5 percent by weight in the former (40:60 mixture) and 8 percent by weight in the latter (20:80 mixture) to provide cement $\epsilon$ and cement $\delta$.

The expansion coefficients of these cements were measured by the same test method as used in Example 1 and are shown in the following table.

TABLE 3

| Type | Expansion Coefficient (x 10$^{-3}$%) Age (day) | | | | | | |
|---|---|---|---|---|---|---|---|
|  | 1 | 2 | 4 | 7 | 14 | 21 | 28 |
| Cement $\epsilon$ | 100 | 154 | 190 | 211 | 220 | 225 | 224 |
| Cement $\delta$ | 94 | 135 | 161 | 182 | 189 | 195 | 196 |

What is claimed is:

1. A cement composition consisting essentially of a cement and from 3 to 10 percent by weight of a crushed sintered mixture of lime and at least one additive selected from the group consisting of ferric oxide, calcium fluoride and calcium sulfate, said crushed sintered mixture being obtained by heating said mixture to a temperature of from about 1,200° to about 1,400°C. for from about 1 to 2 hours followed by cooling and crushing.

2. The cement composition of claim 1, wherein said additive is ferric oxide and said ferric oxide is present at a level of from 3 to 40 percent by weight based on the weight of the crushed sintered mixture.

3. The cement composition of claim 1, wherein said additive is calcium fluoride and said calcium fluoride is present at a level of from 3 to 60% by weight based on the weight of the crushed sintered mixture.

4. The cement composition of claim 1, wherein said additive is calcium sulfate and said calcium sulfate is present at a level of from 30 to 85% by weight based on the weight of the crushed sintered mixture.

* * * * *